(12) United States Patent
Najim et al.

(10) Patent No.: US 9,146,320 B2
(45) Date of Patent: Sep. 29, 2015

(54) METHOD FOR DETECTING AND EXCLUDING MULTIPLE FAILURES IN A SATELLITE

(75) Inventors: Mohamed Najim, Talence (FR); Audrey Giremus, Talence (FR); Frédéric Faurie, Bordeaux (FR)

(73) Assignees: SEGEM DEFENSE SECURITE, Paris (FR); UNIVERSITE DE BORDEAUX 1, Talence (FR); INSTITUT POLYTECHNIQUE DE BORDEAUX, Talence (FR)

( * ) Notice: Subject to any disclaimer, the term of this patent is extended or adjusted under 35 U.S.C. 154(b) by 410 days.

(21) Appl. No.: 13/812,846

(22) PCT Filed: Jul. 15, 2011

(86) PCT No.: PCT/EP2011/062173
§ 371 (c)(1),
(2), (4) Date: Jun. 11, 2013

(87) PCT Pub. No.: WO2012/013524
PCT Pub. Date: Feb. 2, 2012

(65) Prior Publication Data
US 2013/0249734 A1    Sep. 26, 2013

(30) Foreign Application Priority Data
Jul. 29, 2010  (FR) ...................... 10 56282

(51) Int. Cl.
*G01S 19/20* (2010.01)
(52) U.S. Cl.
CPC ..................... *G01S 19/20* (2013.01)
(58) Field of Classification Search
CPC ................. G01S 19/20; G01S 19/15
USPC ....................... 342/357.58, 357.53
See application file for complete search history.

(56) References Cited

U.S. PATENT DOCUMENTS 5,808,581 A * 9/1998 Braisted et al. .......... 342/357.58
8,670,882 B2 * 3/2014 Xie et al. ........................ 701/16
(Continued)

FOREIGN PATENT DOCUMENTS

EP    2120060 A1    11/2013

OTHER PUBLICATIONS

Giremus, Audrey et al., "A GLR Algorithm to Detect and Exclude up to Two Simultaneous Range Failures in a GPS/Galileo/IRS Case" ION GNSS 20th International Technical Meeting of the Satellite Division, Sep. 25-28, 2007, pp. 2911-2923.

*Primary Examiner* — Harry Liu
(74) *Attorney, Agent, or Firm* — Blakely Sokoloff Taylor & Zafman LLP

(57) ABSTRACT

The present invention relates to a method for detecting and excluding at least one pseudo-range measured between a satellite and a receiver for receiving signals transmitted by different satellites of a radio-positioning constellation when said pseudo-range is faulty, characterized in that said method includes the steps of: (a) determining an estimation of the position of the receiver from the pseudo-ranges measured by the receiver, (b) estimating, from the thus-estimated position, biases in the measured pseudo-ranges; (c) processing the thus-obtained biases in order to derive a value representative of the probability of a fault for each pseudo-range; (d) preselecting, on the basis of the resulting values, a given number of pseudo-ranges which are most likely to be faulty; (e) determining, for each combination of pseudo-ranges from among the thus-preselected pseudo-ranges, a value of a test variable representative of the likelihood the combination is faulty; (f) selecting, on the basis of the values of the thus-obtained test variables, at least one combination of pseudo-ranges which are most likely to be faulty; and (g) comparing the test variable associated with the selected combination with a predetermined threshold, and transmitting the signals to the receiver or outward on the basis of the result of said comparison. The invention also relates to an integrity-monitoring system and to a vehicle therefor.

17 Claims, 5 Drawing Sheets

(56) References Cited

U.S. PATENT DOCUMENTS

| | | |
|---|---|---|
| 2003/0117317 A1 | 6/2003 | Vanderwerf et al. |
| 2007/0115171 A1* | 5/2007 | Rahman et al. .......... 342/357.02 |
| 2009/0254275 A1* | 10/2009 | Xie et al. ...................... 701/213 |
| 2009/0273511 A1* | 11/2009 | Schroth ................... 342/357.01 |

* cited by examiner

METHOD FOR DETECTING AND EXCLUDING MULTIPLE FAILURES IN A SATELLITE

GENERAL TECHNICAL FIELD

The present invention relates to the field of integrity-control systems for aviation.

More precisely, it concerns a method for detecting and excluding one or more satellite failures in a navigation system.

PRIOR ART

Vehicles with satellite navigation systems are conventionally equipped with a receiver tracking N satellites, as shown in FIG. 1. Every second, the receiver must determine its position from N measurements originating from the satellites in view.

For each of these satellites, the receiver calculates an estimation of the distance separating them from the latter, called pseudorange due to the different errors by which it is flawed. Each measurement is in fact perturbed by a noise measurement due especially to the wave passing through the atmosphere. However, the statistical characteristics of these measurement noises are known and these perturbations are not considered failures.

However, some satellites can present more substantial faults and provide incorrect information to the receiver, dangerously degrading the precision of the navigation solution. These satellite breakdowns, due essentially to malfunctions of the satellite clock or to problems of ephemerides, result in bias on the failing satellite measurement or the failing satellite measurements which must be detected. These biases are added to the measurements and are modelled either by echelons or by ramps evolving over time.

Even if these satellite breakdowns were rare (probability of the order of $10^{-4}$/h per satellite), navigation systems must take this risk into account, in particular in aviation where a position discrepancy can be fatal.

The aim of integrity-control systems is the detection and exclusion of satellite breakdowns. There are two distinct configurations for the integrity-control systems. When the system is coupled to a navigation support system (such as an inertial system), this means AAIM context (for Aircraft Autonomous Integrity Monitoring). When the integrity-control system operates autonomously, this means RAIM context (for Receiver Autonomous Integrity Monitoring). At a given missed detection probability, fixed by the International Civil Aviation Organisation (ICAO), integrity-control systems must be capable of providing a terminal on the position error of the device and therefore a protection volume around it.

Until recently, the single hypothesis of a single satellite failure was enough to satisfy ICAO requirements. But with the next deployment of novel constellations of satellites (Galileo in 2014 and modernised GPS in 2013), as well as tightening of ICAO requirements, integrity-control systems today must take into account an increase in the number of available satellite measurements. In particular, they must be able to process several simultaneous satellite breakdowns, an event whereof the occurrence probability is no longer negligible.

Various methods have been proposed up to now for providing a solution to the problem of integrity-control.

In a RAIM context, only the redundancy between satellite measurements is applied. Under the assumption of a single failure, the so-called residue method relies on an estimator using N measurements available and on a bank of estimators using N−1 measurements and each excluding a different measurement. The estimators used are of least squares type. Failure detection is done by a test of $\chi^2$ (chi-squared) from the estimator using N measurements. Exclusion is also done by a statistical test of type $\chi^2$ this time from estimators using N−1 measurements.

This approach can be extended in the case of several simultaneous failures by adding banks of estimators excluding more than one measurement, but the number of which depends directly on the number of failures considered at the same instant. So, the computation cost is greatly increased for the case of double failure, for example.

The RANCO system (Range Consensus), presented in the document "Failure detection and exclusion via range consensus", *Proceedings of the ENC GNSS* (2008), by G. Schroth, A. Ene, J. Blanch, T. Walter, and P. Enge, uses as such a, main estimator using N measurements available and a bank of estimators based on different measurement quadruplets. The estimators used are of least squares type. Multiple tests are conducted to compare measurements excluded by each quadruplet to the predicted measurements from estimating the navigation solution based on this quadruplet. Via a mechanism favouring coherence of measurements, the system can identify the faulty measurements and exclude up to N−5 measurements in the same instant.

The limitations of this approach are the choice of subgroups of measurements as well as the difficulty of exclusion decision among the tests. In fact, multiple tests, based on subgroups of different measurements, can indicate different faulty measurements, which can make the exclusion decision difficult. Also, the computational cost is linked directly to the number of estimators and to the number of measurements available.

In an AAIM context, the navigation system is generally coupled to an inertial system. The navigation solution is calculated by a Kalman filter applying satellite measurements to estimate position errors, speed and attitude of the inertial system, as well as systematic errors affecting inertial sensors. The estimates of the Kalman filter help correct the outputs of the inertial system.

MSS approaches (Multiple Solution Separation) and AIME (Autonomous Integrity Monitored Extrapolation) offer initial solutions to the problem of integrity control in GPS/inertial system hybridisation contexts. Both rely on a main estimator supplied by a Kalman filter using N measurements available, and on estimators supplied by a bank of Kalman filters using N−1 measurements, each excluding a different measurement. It should be noted that to perform exclusion the MSS approach per se needs a second bank of estimators based on N−2 measurements.

However, as in the residue method, the number of estimators depends directly on the number of failures considered at the same instant. Therefore, the computational cost is greatly increased for the case of double failure at the same instant, for example.

A third solution, GLR (Generalized Likelihood Ratio), presented originally in the field of the automation and control, was adapted to integrity control for the navigation by Palmqvist, as described in the document "On integrity monitoring of integrated navigation Systems", Thesis No. 600, Linköping Studies in Science and Technology (1997). The aim of classic GLR is detecting failures or failures affecting systems whereof the status is estimated by Kalman filtering. It relies on a test of multiple assumptions. Each assumption supposes an instant of the emergence of failure to which is connected an estimation of the amplitude of the failure in terms of least squares. The latter is obtained directly from innovations (difference between measurement received and measurement predicted by the estimated navigation solution) calculated by the Kalman filter. The number of assumptions is limited to a sliding window of analysis of size L to maintain a reasonable computation cost. The detection of failures is based on the likelihood ratio between an assumption of the instant of emergence of a failure and assumption without failure. The maximum of these test variables defines the likeliest instant of emergence of the failure.

Subsequently, Giremus and Escher presented in the document "A GLR algorithm to detect and exclude up to two simultaneous range failures in a GPS/Galileo/IRS Case", *Proc. of ION GNSS* (2007), an improvement for exclusion of up to K satellite failures in the GNSS context with K≥1. The proposed approach, shown in FIG. 3, consists of estimating by maximum likelihood not only the instant of emergence of the failure or the failures, but also the amplitude of these failures. The principle is the following. Once detection of failure is completed by the GLR system, the proposed method systematically tests the $$\sum_{P=1}^{K} C_N^P$$

combinations of possible failures for N measurements available as follows (with $C_N^P$ the number of combinations of P elements among N):
   estimation of non-zero components of a bias vector $b_t$ according to the combination of supposed measurements en failure;
   statistical test based on the estimated bias vector.

Regarding the detection step where N components of the bias are estimated, the problem of estimation resolved is less. Better estimation of the amplitude of failures is obtained. The maximum of the statistical tests to which a combination comprising P faulty measurements with P≤K≤N is associated is then selected. If the statistical test is greater than a predefined threshold, the approach designates the P measurements as faulty and provides a fresh estimation of the bias vector for the faulty P measurements.

In summary, this approach, based as is AIME on the innovations of the Kalman filter, proves to be interesting as it allows shorter failure detection periods than those of the MSS, while presenting decreased accommodation risks in comparison to the AIME. Also, the possibility of being able to correct the navigation solution as a function of the estimated bias avoids reinitialising the navigation solution after detection/exclusion of a failure. However, the architecture described assures detection and exclusion of multiple failures but at the cost of a high computation cost due to all the assumptions to be considered.

Table 1 presents the number of estimators associated with the methods presented previously, in the event where exclusion up to two simultaneous failures is taken into account.

TABLE 1

Computation cost of different methods associated with exclusion of one to two simultaneous failures among N measurements.

| Method | Number of estimators of Kalman filter type for exclusion of 1 or 2 simultaneous failures | Number of estimators of least squares type for exclusion of 1 or 2 simultaneous failures |
|---|---|---|
| RAIM (residue method) | — | $N + \frac{N(N-1)}{2}$ |
| MSS | $\frac{N(N-1)}{2} + \frac{(N-1)(N-2)}{2}$ | — |
| GLR | — | $N + \frac{N(N-1)}{2}$ |
| AIME | $N + \frac{N(N-1)}{2}$ | — |

In general, the computational cost is therefore in $O(N^2)$ for exclusion of 1 to 2 simultaneous failures, which rises if up to K possible simultaneous failures are considered at $$O\left(\sum \frac{N!}{K!(N-K)!}\right)_{K \to N} \approx O(2^N).$$

This exponential cost is prohibitive on current equipment.

PRESENTATION OF THE INVENTION

The aim of the present invention is to resolve these difficulties by proposing a method for detection and exclusion of several faulty pseudoranges. This method, at a highly reduced computation cost, considers two simultaneous satellite failures or even more in a constellation of about fifteen satellites without the need for calculating power substantially greater than that of current onboard systems, and therefore without additional cost.

With this taking into account of a larger number of possible incidents, the invention allows increased aerial security, considering cases which to date would have resulted in aerial catastrophes.

In addition, another aim of the invention is to arrive at this objective by proposing a method which can be integrated into both an AAIM context and a RAIM context. There is therefore total adaptability.

The present invention therefore relates to a method for determining a protection volume in the event of two faulty measurements of pseudorange between a satellite and a receiver receiving signals transmitted by different satellites of a radio-positioning constellation, characterised in that it comprises steps of:
   (a) Determining a test variable representative of the likelihood of a fault as a function of the pseudoranges measured by the receiver;
   (b) Estimation, from the accordingly estimated position, of biases in the measured pseudoranges;
   (c) Processing of accordingly obtained biases to deduce therefrom a value representative of the probability of a failure for each pseudorange;
   (d) Pre-selecting, as a function of the accordingly obtained values, a given number of pseudoranges the likeliest to present failure;
   (e) Determining, for each combination of pseudo-distances among the accordingly pre-selected pseudoranges, a variable test value representative of the likelihood of the failure of the combination;
   (f) Selecting, as a function of the accordingly obtained variable test values, at least one combination of pseudoranges, failure of which is the likeliest;

(g) Comparing the test variable associated with the selected combination to a predefined threshold and transmission of a signal to the receiver or outwards as a function of the result of this comparison.

According to other advantageous and non-limiting characteristics of the invention:

a test variable $$T_j, j \in \left[1, \sum_{P=1}^{K} C_M^P \right],$$

is calculated at step (e) for all possible combinations from 1 to K pseudoranges among the M pseudoranges pre-selected at step (d), K being a fixed whole number less than or equal to M;

the calculation of each test variable $T_j$ is done using a statistical test based on estimation of the bias vector $b_t'$ corresponding to a bias vector $b_t$ whereof the components not associated with the combination of considered measurements are set to zero;

the statistical test used follows a $\chi^2$ distribution with P degrees of freedom, P being the number of pseudoranges comprising the considered combination;

the predefined threshold used during step (g) is adapted in a threshold $T_{d,j}$ specific to each combination, the ratio $$R_j = \frac{T_j}{T_{d,j}}$$

being constructed and used in place of test variables $T_j$;
K is the maximum number of faulty pseudoranges in question, and M is a number greater than the maximum number of faulty pseudoranges in question;

step (b) also provides the estimation $\hat{k}$ of the instant of emergence of the estimated biases;

step (b) comprises sub-steps of:
(b1) Estimating a plurality of bias vector $b_t$, each under the assumption of the emergence of a failure at an instant $k \in [t-L+1, t]$ of a sliding window of analysis of fixed size L;
(b2) Calculating, at each instant k in question, a likelihood ratio $R_t[k]$ between the assumption of the emergence of a failure at the instant k and assumption without failure, as a function of the estimated biases under the assumption of the emergence of a failure at the instant k;
(b3) Estimating the likeliest instant of emergence of a failure $\hat{k}$ from likelihood ratios;
(b4) Selecting the bias vector corresponding to the assumption of the emergence of a failure at the instant $\hat{k}$;

step (b) also comprises an alert sub-step (b5) if the likelihood ratio associated with the instant $\hat{k}$ reaches a predefined threshold;

a bias vector $b_t$ under the assumption of the emergence of a failure at an instant k is obtained from the innovation calculated by a Kalman filter at the instant k, said Kalman filter conducting step (a);

the biases are expressed as a function of time t and the index i associated with a pseudorange, in the form $b_{i,t}[k] = \alpha_i + \beta_i(t-k)$;

the representative values of the probability of failure for each pseudorange obtained at step (c) are failure criteria $\Gamma_j$ expressed in the form $\Gamma_i = [\hat{\alpha}_i, \hat{\beta}_i](C_i)^{-1}[\hat{\alpha}_i, \hat{\beta}_i]^T$;

the M pseudoranges the likeliest to present failure are the M pseudoranges associated with the M largest values of $\{\Gamma_1\}_{i \in [1,N]}$, M being the given number of pseudoranges to be pre-selected;

the likeliest combination of faulty measurements is the combination associated with the ratio $R_{E_P}$ such as $R_{E_P} = \max\{R_j\}_{j \in [1, 2^M]}$.

According to a second aspect, the invention relates to an integrity-control system comprising data-processing means, associated with a receiver receiving signals emitted by different satellites of a constellation of radio-positioning and providing the system with pseudoranges measured between satellites of said constellation and the receiver on which the means carry out a method according to the first aspect of the invention, on completion of which a signal is transmitted to the receiver.

According to other advantageous and non-limiting characteristics of the invention:

the system is coupled to an inertial navigation device according to an AAIM context.

The invention finally concerns a vehicle equipped with a system according to the second aspect of the invention.

PRESENTATION OF THE FIGURES

Other characteristics and advantages of the present invention will emerge from the following description of a preferred embodiment. This description will be given in reference to the attached diagrams, in which.

DETAILED DESCRIPTION

Figure 1:
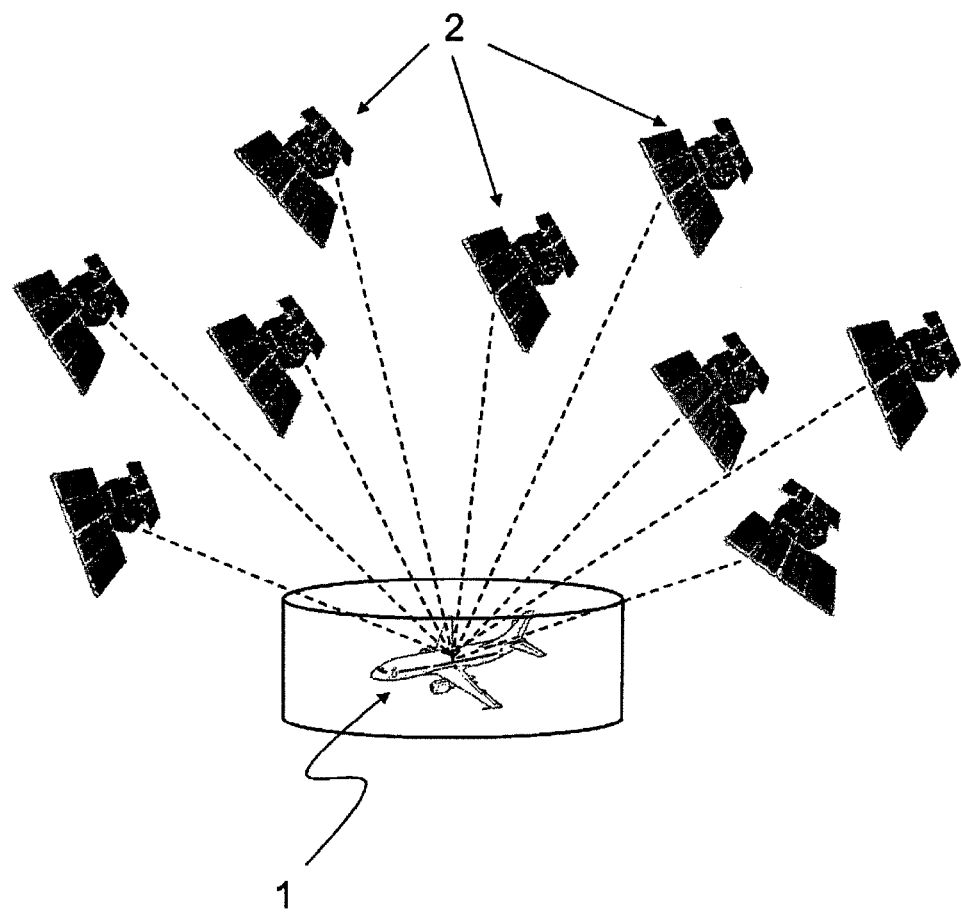
FIG. 1 is a diagram of a constellation of satellites sending data to a plane in its protection volume.

As shown in FIG. 1 then 2, a vehicle 1 such as a plane, equipped with a receiver 10 of GNSS type, receives electromagnetic signals (generally microwaves) originating from a plurality of satellites 2 forming a radio-positioning constellation.

Each satellite 2 is equipped with a high-precision clock, and the receiver 10 precisely knows their position due to ephemerides stored in a memory 13. Because of the clock, the time can be measured precisely by a signal for creating the trajectory between the satellite 2 and the receiver. For this, the receiver 10 uses a correlation technique to estimate the propagation time of the satellite signal, between emission and receipt. Knowing the speed of light, at which the wave of the signal moves, a computer 11 comprised in the receiver 10 multiplies the duration measured by this speed, providing the pseudorange which separates it from the satellite 2, as explained previously. The fact that the distance is not known for sure especially because of the noise measurement causes some uncertainty as to the position of the vehicle 1. The cylinder illustrated in FIG. 1 corresponds to the volume centre on the estimated position in which the presence of the vehicle is guaranteed close to a missed detection probability.

In general, the navigation measurement equation by satellite among a constellation of N satellites is shown as:

$$\tilde{Y}_t = h_t(r_t, b_{H,t}) + \epsilon_t + b_t$$

where, at the instant t:

$\hat{Y}_t$ is the vector containing N measurements formed by the receiver, that is, N pseudoranges calculated according to the principle hereinabove with each of the N satellites, $\epsilon_t$ is the vector of N supposed Gaussian and centred measurement noises, $b_t$ is the vector of N bias impacting the N measurements whereof several components can be non zero, the $i^{th}$ component of the vector function $h_t(\cdot)$ represents the geometric distance separating the receiver from the $i^{th}$ satellite, perturbed by the clock bias. It is expressed as follows: $h_t^i(r_t, b_{H,t}) = \|r_t - r_t^i\| + b_{H,t}$ where $b_{H,t}$ is the clock bias, and $r_t$ and $r_t^i$ designate the position in Cartesian coordinates of the receiver and of the $i^{th}$ satellite, respectively. $E_N$ is the set such that its $i^{th}$ element $E_N^i$, $i \in [1,N]$ is the $i^{th}$ satellite measurement.

By linearising around an adequately selected point, the measurement equation becomes $$Y_t = H_t X_t + \epsilon_t$$

where, at the instant t:

$X_t$ is the status vector containing the position of the receiver, $H_t$ is the linearised observation matrix.

Figure 2:
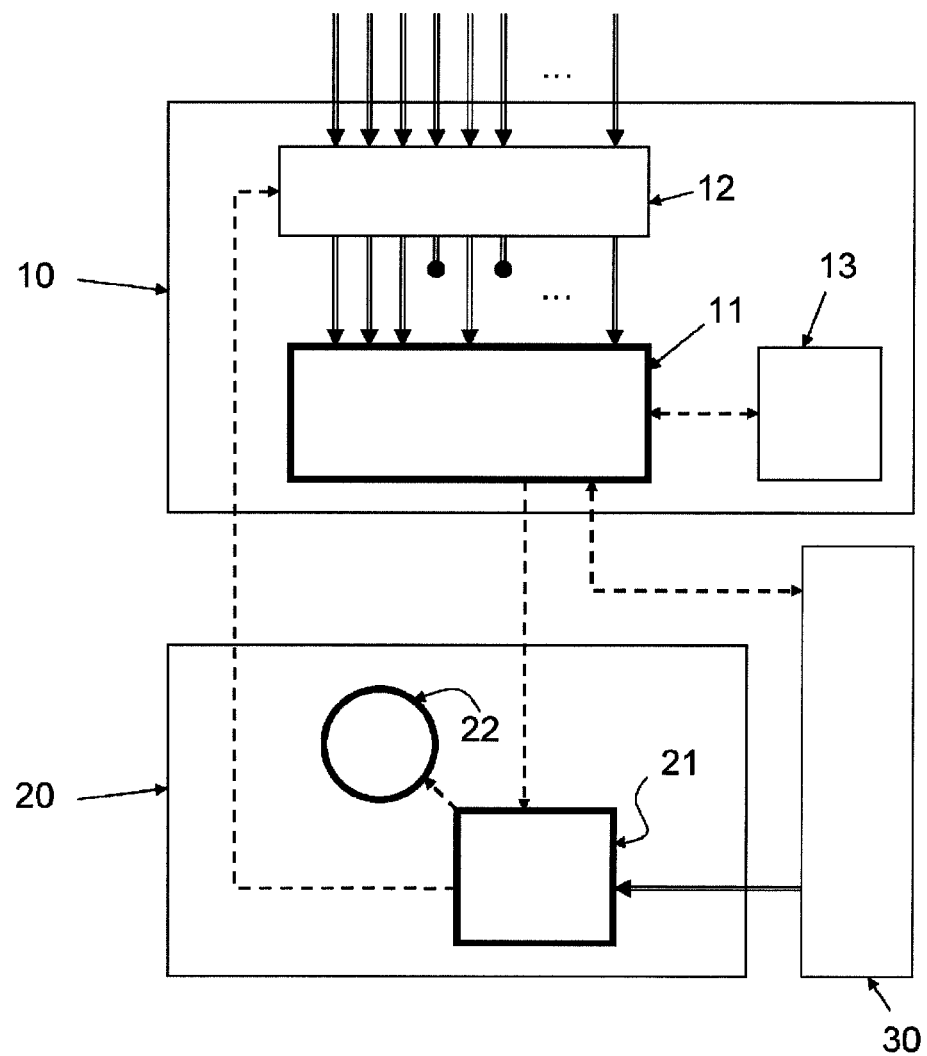
FIG. 2 is a diagram of an embodiment of an integrity-control system according to the invention connected to a receiver.
Figure 3:
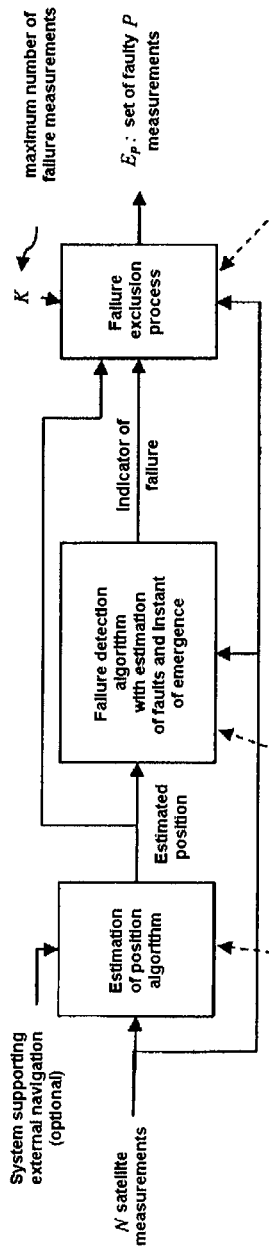
FIG. 3 is a diagram of a known method of detection and exclusion of at least one faulty measurement of a pseudorange of a satellite with a receiver.

The method for detection and exclusion according to the invention is executed by an integrity-control system 20, also illustrated in FIG. 2, connected to the receiver 10. This system 20 receives N satellite measurements supplied by the receiver 10. In the description, $i^{th}$ satellite measurement will designate the pseudorange measured between the $i^{th}$ satellite of the radio-positioning constellation observed and the receiver 10, calculated by a computer 11 comprised in this receiver 10.

After professing, most often the integrity-control system 20 does nothing, in this case in the absence of faulty pseudorange. In the contrary case, it excludes the P measurements identified as faulty from the set of N measurements. For this, the receiver 10 comprises means 12 for managing channels, that is, a unit which listens to the satellites 2 and chooses or not to use the associated satellite measurements. If the method detects a failure over a combination of satellites, it sends to the means 12 for managing channels the instruction to no longer use the satellite measurements associated with those satellites declared as faulty.

Until the problem is considered to be resolved, the vehicle 1 equipped with the integrity-control system 20 and the receiver 10 will navigate, solely taking into account the measurements supplied by the other satellites, still considered as reliable. An alarm can optionally be raised to prevent detection and exclusion of faulty measurements.

Figure 4:
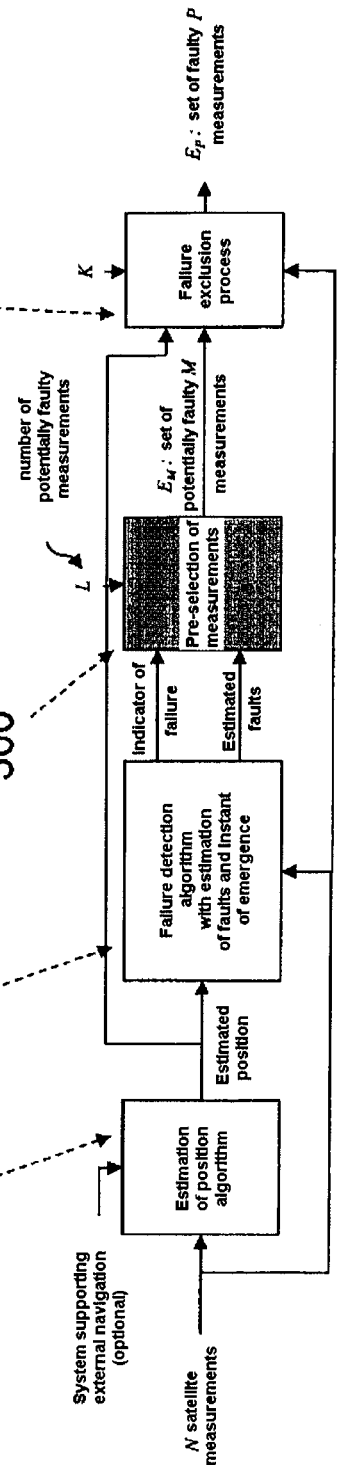
FIG. 4 is a diagram of an embodiment of the method of detection and exclusion of at least one faulty measurement of a pseudorange of a satellite with a receiver according to the invention.
Figure 5:
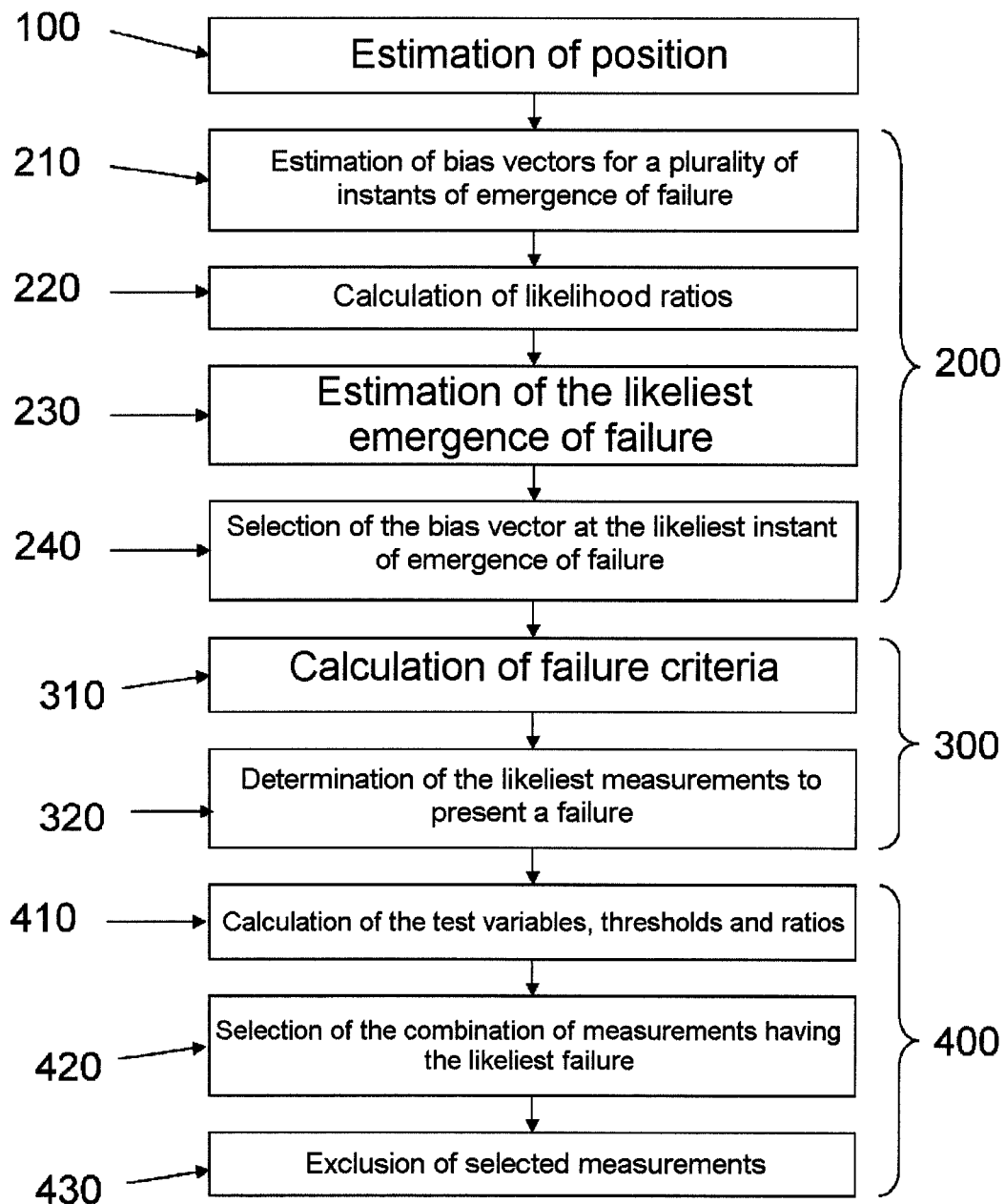
FIG. 5 is a diagram showing the steps of an embodiment of the method of detection and exclusion of at least one faulty measurement of a pseudorange of a satellite with a receiver according to the invention.

The steps of an embodiment of the method for detection and exclusion according to the invention are represented in FIG. 4, and more particularly in FIG. 5.

Estimation of Position

Detection and exclusion of failures start similarly to a method of GLR type with a first step 100 for determining an estimation of the position of the receiver 10 from N satellite measurements, an estimation which at each instant t provides the coordinates of the vehicle 1.

This step 100 adapts both to a RAIM context and an AAIM context. In fact, in the second case it can advantageously include data originating from an external navigation system.

In one case as in the other, algorithms for creating an estimation of the position of the receiver 10 are known; for example, a Kalman filter could be used.

Failure Detection

Once the position of the receiver 10 is estimated, the method according to the invention determines the presence or the absence of failure, in a second step 200, from N satellite measurements available and the position of the estimated mobile.

For this, the system 20 will provide an estimation of a bias vector $b_t$ perturbing the measurements (estimation of faults) at the instant t, and advantageously of its instant of emergence, noted $\hat{k}$. This vector $b_t$ is formed from biases each affecting measured pseudoranges. For this, an advantageous approach reducing the computation cost consists of analysing a sliding time window of width L. Each of the instants $k \in [t-L+1,t]$ is potentially the instant of emergence of the failure. The processing means 21 of the exclusion system 20 therefore estimate during a first sub-step 210 bias vectors $b_t$ for a plurality of instants k. If a Kalman filter has been used for estimating position, the bias vector $b_t$ for an instant k (simply noted vector $b_t[k]$) can advantageously be deduced by estimation in terms of least squares on the innovation vector of the Kalman filter at the instant k. Alternatively, other algorithms enabling this calculation are known, and the person skilled in the art can adapt them to the invention.

For each of these bias vectors $b_t[k]$, the processing means 21 then calculate during a sub-step 220 a likelihood ratio $R_t[k]$ between the assumption of the emergence of a failure at the instant k, noted $H_k$, and assumption without failure, noted $H_0$. This is for example a ratio of conditional probabilities $$R_t[k] = 2\log \frac{p(Y_{k:t} \mid H_k, Y_{1:k-1}, \hat{b}[k])}{p(Y_{k:t} \mid H_0, Y_{1:k-1})}.$$

In a following sub-step 230, estimation of the likeliest instant of emergence of a failure $\hat{k}$ is done from likelihood ratios. In the assumption of use of the preceding formula, this is done by taking the maximum of the ratios on the plurality of tested instants k of the window:

$$\hat{k} = \operatorname*{argmax}_k (R_t[k]).$$

The bias vector $b_t$ corresponding to the assumption of the emergence of a failure at the instant $\hat{k}$ is finally selected and provided in a final sub-step 240.

Advantageously, if $R_t[\hat{k}]$ reaches a predefined threshold (as a function of the sensitivity selected), an alert signifying that a failure has been detected is triggered automatically.

Pre-Selection of Measurements Principle

Once the detection of failure is done, the integrity-control system 20 must decide which measurements are erroneous, if appropriate, exclude them and correct the navigation solution as a consequence.

Figure 6:
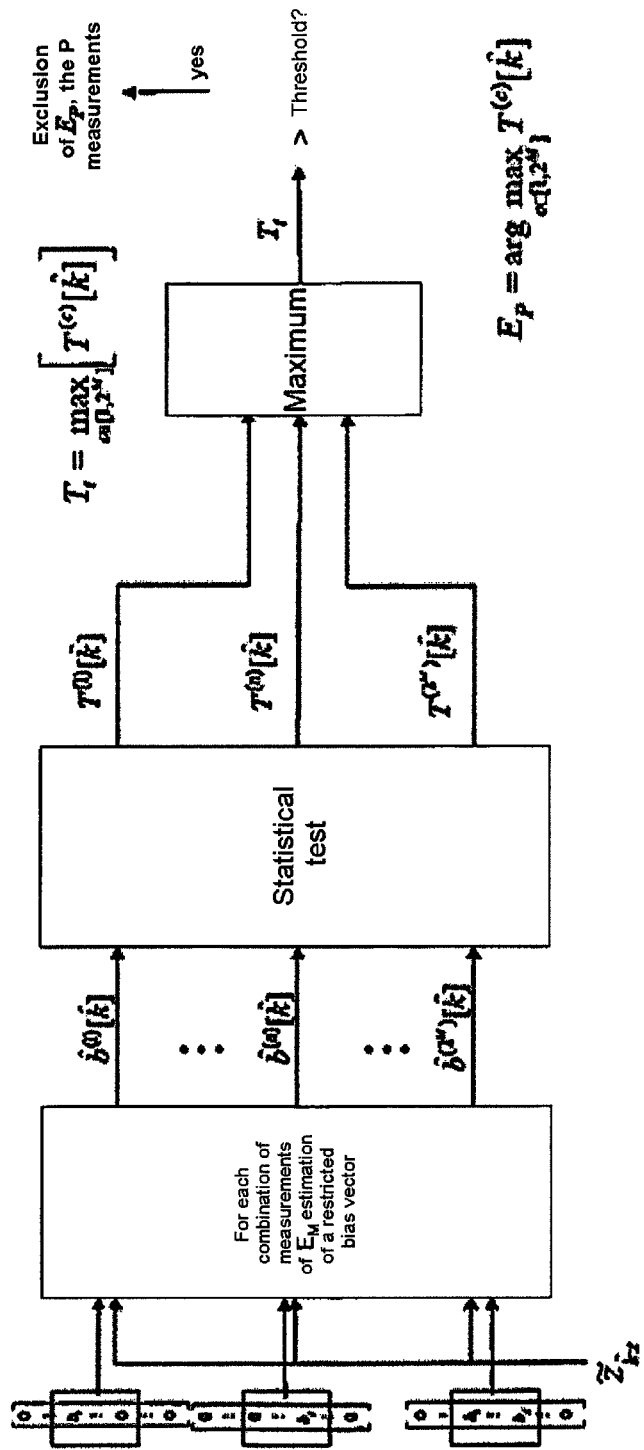
FIG. 6 is a diagram of an embodiment of a step of the method of detection and exclusion of at least one faulty measurement of a pseudorange of a satellite with a receiver according to the invention.

If the aim is to suppose the possibility of two failures, until now it was necessary to test all measurement pairs, or even all combinations of K among N measurements if this is not limited to the case of double failure. To avoid this systematic test, which needs calculation power not available in current equipment, the invention proposes identifying faulty measurements in two steps, by performing a first step for pre-selecting the potentially faulty measurements prior to testing different combinations. This step 300, which consists of constructing a subset $E_M$ containing the M satellite measurements the likeliest to present failure, M being a fixed whole number less than or equal to N, is conducted. Once this pre-selection has been completed, exhaustive testing can be carried out of the remaining combinations of faulty measurements, combinations whereof the number proves far less than previously. This method is shown in FIG. 6. A particularly preferred embodiment of this pre-selection step will follow.

Pre-Selection of Measurements—Failure Criteria

In noting $b_{i,t}[k]$, or simply $b_i$ if $k=\hat{k}$, the $i^{th}$ component of the bias vector appearing at the instant k, we suppose that $b_{i,t}[k]$ can be represented by an expression depending on a set of parameters $\theta_i$. A possible realisation of this representation, but one which does not constitute limitation to the invention, can be:

$$b_{i,t}[k]=\alpha_i+\beta_i(t-k)$$

where $\theta_i=[\alpha_i, \beta_i]$ and k is the instant of emergence of the failure on the measurement i. This model jointly manages failures of ramp and echelon type.

Knowing the statistical characteristics of the estimations of the parameters $\{\theta_i\}_{i \in [1,N]}$ of the bias vector $b_t$ and generally the bias expressions $b_i$, a representative value of the probability of a failure for each pseudorange, called a failure criterion noted $\Gamma_i$ is constructed during a first sub-step 310 for each measurement $i \in [1, N]$. The failure criterion first identifies the satellite measurements likely to present a fault at the likeliest. In fact, in the absence of failure on the measurement i, the parameters $\theta_i$ must be close to 0, whereas in the presence of a failure on the measurement i, they must differ from 0.

Considering the bias $b_i$ on the measurement i put in the form described by the expression hereinabove, realisation of the failure criterion on the measurement i can be advantageously:

$$\Gamma_i=[\hat{\alpha}_i,\hat{\beta}_i](C_i)^{-1}[\hat{\alpha}_i,\hat{\beta}_i]^T$$

where $\hat{\alpha}_i$, $\hat{\beta}_i$ are the estimations of parameters $\alpha_i$, $\beta_i$, $[\cdot]^T$ designate the transpose of a vector or of a matrix and $C_i$ is the matrix of covariance of parameters $\alpha_i$ and $\beta_i$.

Standardisation by $C_i$ takes into account the influence of measurement noise on the quality of the estimations $\alpha_i$ and $\beta_i$.

Pre-Selection of Measurements—Construction of $E_M$

The M satellite measurements the likeliest to present failure according to the values of $\{\Gamma_i\}_{i \in [1,N]}$ are determined by the system 20 during a sub-step 320. So, if the above formula were used for the calculation of $\Gamma_i$, the set $E_M$ of M satellite measurements likely to present a fault at the likeliest is formed by selecting the M measurements associated with the M largest values of $\{\Gamma_i\}_{i \in [1,N]}$.

It should be noted that these measurements correspond to the sole instant of emergence of a failure $\hat{k}$ provided during step 230. In the event where only the assumptions of simultaneous single and double satellite failures are considered, realisation of M could be M=3 to ensure a degree of liberty in identifying failures. In fact, it is important for faulty measurements to belong to the set of pre-selected measurements $E_M$, failing which they risk not excluding measurements which might be faulty. In general, M will be taken advantageously as being the maximum number of supposed satellite failures plus one.

Exclusion of Failures

This is step 400. The principle of exclusion of failures is for example based on the approach presented by Giremus and Escher. The difference is in the restriction of the number of assumptions to be considered. From the set $E_M$ of potentially faulty M satellite measurements, the position estimated during step 100 and the instant of emergence of the estimated failure $\hat{k}$ provided during step 230, $$\sum_{P=1}^{K} C_M^P$$

assumptions corresponding to the combinations of possible failures from M measurements selected during pre-selection are considered, K being a fixed whole number less than or equal to M, advantageously the maximum number of satellite failures considered.

For this, for each combination of potentially faulty measurements a test variable $T_j$ is first calculated during a substep 410 from the bias vector $b_t$. Advantageously, the test $T_j$ uses only the components corresponding to the combination of measurements supposed to be faulty, and more particularly their parameters $\theta_i$, if appropriate.

So as to keep only those components corresponding to the measurements of the tested combination, the processing means 21 for example use a bias vector $b_t'$, corresponding to the vector $b_t$, whereof the components not associated with the combination of measurements considered are set to zero. The statistical test is then performed. Advantageously, this is a test which follows a $\chi^2$ distribution with P degrees of freedom, with P the number of measurements of the considered combination, for example a test similar to the likelihood test described previously.

The values of test variables $T_j$ are intended to be compared to a predefined threshold corresponding to a given missing exclusion probability, but to the extent where all the combinations tested do not have the same number of measurements, the number of degrees of liberty, and therefore the threshold of statistical tests associated with each combination are potentially different.

The result $$\sum_{P=1}^{K} C_M^P$$

is statistical tests $T_j$ and associated thresholds $T_{d,j}$, or up to $2^M$ (if K=M). Advantageously, the ratio $$R_j = \frac{T_j}{T_{d,j}}$$

is constructed for each combination. The likeliest combination of faulty satellite measurements is selected during sub-step 420, advantageously the combination associated with the maximum of test variables, that is, the variable $R_{Ep}$ such as $R_{Ep} = \max\{R_j\}_{j \in [1,2^M]}$.

The processing means 21 of the integrity system 20 directly deduce the subset $E_P \subset E_M$ corresponding to the P measurements (P≤M) of the combination selected. The value of P is not predetermined: suppose for example that there are up to two failures, not excluding that there may be a single failure. The likeliest combination of deficient satellite measurements in this case could be constituted by a single measurement.

If the ratio $R_{Ep}$ is greater than 1, that is, if the test variable $T_{Ep}$ is greater than the predefined threshold corresponding to a given missing exclusion probability mentioned previously, the method of exclusion of failures designates the P measurements as faulty and provides a fresh estimation of the parameters of the bias vector for the P faulty measurements during step 430. In the event where the statistical test is less than the threshold ($R_{EP}<1$), exclusion is not effected but detection of failure indicates to the system that one or more faults are present on the satellite measurements but that they are not yet identified.

Advantageously, from estimations of the parameters of the bias vector for the P faulty measurements and from the instant of emergence of the estimated failure $\hat{k}$, the impact of different failures on the navigation solution can be corrected.

Systems and Vehicles

According to a second aspect, the invention concerns systems, in particular an integrity-control system 20 such as shown in FIG. 2. As described previously, the system 20 is connected to a receiver 10, of GNSS type, configured to receive measurements coming from N satellites. The receiver 10 comprises data-processing means 11 and channel management means 12 and a memory 13. The latter listen to visible satellites 2, and accept or do not accept the satellite measurements for their part according to the instructions which they have received. They transfer the measurements conventionally to onboard instruments to allow exploitation of geolocation data calculated from the satellite measurements, as well as to the system 20 which will control them.

The system 20 also comprises data-processing means 21, by which it will be able to execute a method according to the first aspect of the invention. Once the method is executed, the processing means 21 will if necessary communicate with the channel management means 12 a list of satellite measurements found to be faulty. The connected satellites are then blocked. The system 20 optionally comprises an alarm interface 22. This interface 22 can take numerous forms such as a monitor, a loudspeaker, a console for sending messages, and generally serves to warn of the detection of at least one satellite failure by the system 20.

Also, the system 20 and the receiver 10 can advantageously be coupled to a navigation system 30, such as an inertial system, providing the data-processing means 21 and 11 with navigation data which can be used during the failure detection step to be in an AAIM context.

The invention also relates to a vehicle 1, in particular a plane, equipped with such an integrity-control system 20, allowing it an unequalled level of security, since it is no longer aware of the possibility of having two simultaneous satellite breakdowns, a case not treated previously, and which might result in an aerial catastrophe if an excessively limited protection volume was calculated due the possibility of a second faulty measurement. The invention is not however limited to planes and can be fitted to any aircraft, or even a ship or terrestrial vehicle, even if the integrity requirement of satellite measurements is not as crucial.

The invention claimed is:

1. A method for detection and exclusion of at least one pseudorange measured between a satellite and a receiver receiving signals emitted by different satellites of a radio-positioning constellation, when this pseudorange is faulty, characterised in that it comprises steps of:
   (a) Determining estimation of the position of the receiver from the pseudoranges measured by the receiver;
   (b) Estimating, from the accordingly estimated position, biases in the pseudoranges measured;
   (c) Processing accordingly obtained biases to deduce therefrom a value representative of the probability of failure for each pseudorange;
   (d) Pre-selecting, as a function of the accordingly obtained values, a given number of pseudoranges the likeliest to present failure;
   (e) Determining, for each combination of pseudoranges among the accordingly pre-selected pseudoranges, a variable test value representative of the likelihood of the failure of the combination;
   (f) Selecting, as a function of the accordingly obtained variable test values, at least one combination of pseudoranges failure of which is the likeliest;
   (g) Comparing the test variable associated with the selected combination at a predefined threshold and transmission of a signal to the receiver or outwards as a function of the result of this comparison.

2. The method according to claim 1, in which a test variable $$T_j, j \in \left[1, \sum_{P=1}^{K} C_M^P\right]$$

is calculated at step (e) for all possible combinations of 1 to K pseudoranges among the M pseudoranges pre-selected at step (d), K being a fixed whole number less than or equal to M.

3. The method according to claim 2, in which the calculation of each test variable $T_j$ is carried out by means of a statistical test based on estimation of the bias vector $b_t'$ corresponding to a bias vector $b_i$, whereof the components not associated with the considered combination of measurements are set to zero.

4. The method according to claim 3, in which the statistical test used follows a $\chi^2$ distribution with P degrees of freedom, P being the number of pseudoranges of the considered combination.

5. The method according to any one of claims 2 to 4, in which the predefined threshold used during step (g) is adapted in a threshold $T_{d,j}$ specific to each combination, the ratio $$R_j = \frac{T_j}{T_{d,j}}$$

being constructed and used in place of the test variables $T_j$.

6. The method according to claim 1, in which K is the maximum number of faulty pseudoranges in question, and M is a number greater than the maximum number of faulty pseudoranges in question.

7. The method according to claim 1, in which step (b) also provides the estimation $\hat{k}$ of the instant of emergence of estimated biases.

8. The method according to claim 7, in which step (b) comprises the sub-steps of:
   (b1) Estimating a plurality of bias vectors $b_t$, each under the assumption of the emergence of a failure at an instant $k \in [t-L+1,t]$ a sliding window of analysis of fixed size L;
   (b2) Calculating, at each instant k in question, a ratio $R_t[k]$ of likelihood between the assumption of the emergence of a failure at the instant k and the assumption without failure, as a function of estimated biases under the assumption of the emergence of a failure at the instant k;

(b3) Estimating the instant of emergence of the likeliest failure $\hat{k}$ from likelihood ratios;

(b4) Selecting the bias vector corresponding to the assumption of the emergence of a failure at the instant $\hat{k}$.

9. The method according to claim 8, in which step (b) also comprises an alert sub-step (b5) if the likelihood ratio associated with the instant $\hat{k}$ reaches a predefined threshold.

10. The method according to any one of claims 7 to 9, in which a bias vector $b_t$ under the assumption of the emergence of a failure at an instant k is obtained from the innovation calculated by a Kalman filter at the instant k, said Kalman filter performing step (a).

11. The method according to claim 7, in which the bias are expressed as a function of time t and of the index i linked to a pseudorange, in the form $b_{i,t}[k]=\alpha_t \alpha \beta_i(t-k)$.

12. The method according to claim 11, in which the representative values of the probability of failure for each pseudorange obtained at step (c) are failure criteria $\Gamma_i$ expressed in the form $\Gamma_i=[\hat{\alpha}_i,\hat{\beta}_i](C_i)^{-1}[\hat{\alpha}_i,\hat{\beta}_i]^T$.

13. The method according to claim 1, in which the M pseudoranges the likeliest to present failure are the M pseudoranges associated with the M largest values of $\{\Gamma_i\}_{i\in[1,N]}$, M being the given number of pseudoranges to be pre-selected.

14. The method according to claim 5, in which the combination of the likeliest faulty measurements is the combination associated with the ratio $R_{E_P}$ such as $R_{E_P}=\max\{R_j\}_{j\in[1,2^M]}$.

15. An integrity-control system (20), comprising data-processing means (21), linked to a receiver (10) receiving signals transmitted by different satellites of a radio-positioning constellation and supplying the system (20) with pseudoranges measured between satellites of said constellation and the receiver (10) on which the means (21) execute a method according to claim 1, on completion of which a signal is transmitted to the receiver (10).

16. A system according to claim 15, characterised in that it is coupled to an inertial navigation device (30) according to an AAIM context.

17. A vehicle (1) equipped with a system according to claim 15 or 16.

* * * * *

UNITED STATES PATENT AND TRADEMARK OFFICE
CERTIFICATE OF CORRECTION

PATENT NO. : 9,146,320 B2  
APPLICATION NO. : 13/812846  
DATED : September 29, 2015  
INVENTOR(S) : Mohamed Najim et al.

Page 1 of 1

It is certified that error appears in the above-identified patent and that said Letters Patent is hereby corrected as shown below:

On the Title Page, in Item [73], under Assignees, please delete "Segem" and insert --Sagem--.

Signed and Sealed this  
Eighth Day of March, 2016

Michelle K. Lee  
*Director of the United States Patent and Trademark Office*